(12) United States Patent
Resios et al.

(10) Patent No.: US 11,907,731 B1
(45) Date of Patent: Feb. 20, 2024

(54) CONFIGURABLE CLOUD DEVELOPMENT ENVIRONMENTS

(71) Applicant: Amazon Technologies, Inc., Reno, NV (US)

(72) Inventors: Andreas Resios, Valea Lupului (RO); Ida Mia Olsen, Berlin (DE); Martin Oliver Rehfeld, Paulinenaue (DE); Fabian Jakobs, Amsterdam (NL); Timir Karia, Amsterdam (NL); Jonathan Weiss, Berlin (DE)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 17/364,084

(22) Filed: Jun. 30, 2021

(51) Int. Cl.
*G06F 8/65* (2018.01)
*G06F 9/445* (2018.01)
*H04L 67/10* (2022.01)

(52) U.S. Cl.
CPC ............ *G06F 9/44505* (2013.01); *G06F 8/65* (2013.01); *H04L 67/10* (2013.01)

(58) Field of Classification Search
CPC .................... G06F 9/44526; G06F 9/5077
See application file for complete search history.

(56) References Cited

U.S. PATENT DOCUMENTS

| | | | |
|---|---|---|---|
| 10,353,798 B1* | 7/2019 | Diac | G06F 8/30 |
| 2019/0028336 A1* | 1/2019 | Coronado | H04L 67/34 |
| 2020/0065229 A1* | 2/2020 | Alexander | G06F 8/70 |
| 2021/0117210 A1* | 4/2021 | Yueh | G06F 3/0482 |

* cited by examiner

*Primary Examiner* — Duy Khuong T Nguyen
(74) *Attorney, Agent, or Firm* — Hogan Lovells US LLP

(57) ABSTRACT

Systems and methods provide for deployment of an integrated development environment configured to include one or more tools associated with specific code portions being executed within the integrated development environment. A user may provide a request to access one or more projects and definition files associated with the one or more projects may be evaluated to determine one or more tools used for execution of the source code of the one or more projects. The one or more tools may be automatically incorporated into whichever integrated development environment the user selects to ensure proper execution of the code without manual updates or installation by the user.

20 Claims, 11 Drawing Sheets

CONFIGURABLE CLOUD DEVELOPMENT ENVIRONMENTS

BACKGROUND

As an increasing number of applications and services are being made available over networks such as the Internet, an increasing number of content, application, and service providers are turning to technologies such as remote resource sharing and cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources. The user may wish to provision a number of different resources associated with their accounts, but may experience problems when different users try and implement custom configurations for applications using those resources.

BRIEF DESCRIPTION OF THE DRAWINGS

Various embodiments in accordance with the present disclosure will be described with reference to the drawings, in which.

DETAILED DESCRIPTION

Figure 1:
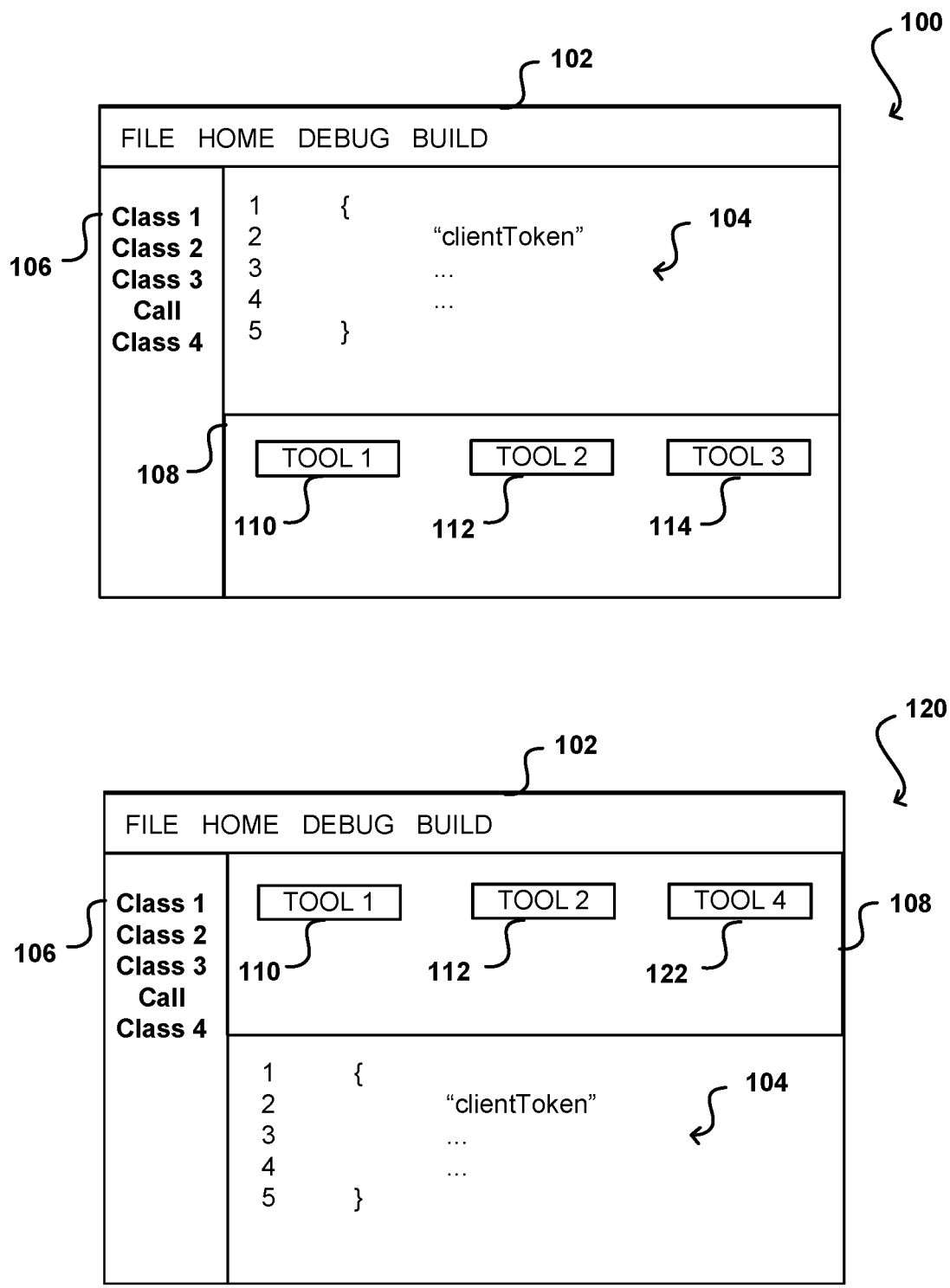
FIG. 1 illustrates example interfaces of development environments that can be utilized in accordance with various embodiments.

Users may wish to utilize cloud resources during development, such as generating source code for one or more applications, to remove sensitive material from individual work stations, harness improved computing resources, or to store one or more working files within a central repository with various governance and security applications. In certain instances, development may be utilized to build applications, such as computer programs that may be used for web applications or the like. Individual users may be performing coding operations or otherwise write portions of software applications using a variety of different tools, which may include one or more integrated development environments (IDEs).

An IDE may correspond to a software application that includes one or more facilities for software development, such as a debugger or an automated build tool. The choice of IDEs between individual users may vary, and may be based on personal or stylistic choices. Moreover, individual users may configure personal IDEs differently, such as incorporating different tools, add-ins, or extensions, which may create discontinuity when portions of software are executed on other IDEs that do not include the customized configurations. For example, certain extensions or features of the extensions may be integrated with the source code and if another user operating without those extensions attempts an operation with the code (e.g., build, debug, run, etc.), an error may occur. Furthermore, individual users may store their IDEs and configurations locally (e.g., on a personal device), and as a result, may download or otherwise save copies of source code, which may create security risks with respect to theft of the device or insufficient security provisions on the device. Furthermore, saving localized copies of the source code may lead to inconsistency within a final product because changes may not be accurately merged into a single, cohesive file.

Embodiments of the present disclosure are directed to one or more environments, which may be referred to as development environments (DEs) or managed development environments (MDEs) to instantiate an IDE using one or more definitions stored together with, or accessible along with, a project source code. In one or more embodiments, individual IDEs are provided for users with a consistent set of toolkits (e.g., tools, add-ins, extensions, etc.) within a secure environment to enable development of applications using an individual user's personalized and preferred IDE while also incorporating features relevant to or associated with particular source code. Accordingly, development tools may be moved to remotely accessible environments where individual users may continue to operate using an IDE of their choice that is automatically configured to include necessary plug-ins, extensions, add-ins, libraries, tools, or the like.

Various embodiments are directed toward a definition (e.g., a def file, a definition file) that incorporates information related to one or more tools (e.g., libraries, compliers, debuggers, toolkits, etc.) used with a particular or project. Moreover, the definition may also include deployment information for the project, such as restrictions on segments deployed to individual users, formatting options, and the like. Responsive to an authorized request to access the source code, one or more controllers associated with the MDE may check out the source code, read the definition, identify the one or more tools, apply applicable security patches, and deploy a dedicated replica of one or more applications for utilization with development of the source code. In one or more embodiments, features of the present disclosure may utilize this infrastructure-as-code information for management and provisioning within one or more data centers. In one or more embodiments, individual users may interact within created environments by attaching an IDE, which is instantiated within the environment. Thereafter, the user can perform tasks as they normally would within the IDE, which is provisioned with all of the tools and information associated with the source code.

In at least one embodiment, management tools may be incorporated that enable users to visualize interactions between components, execute commands, view logs, set breakpoints, and deploy changes without pushing code back to a shared repository. As a result, collaboration is enabled among a variety of different users, which may preferentially choose to utilize different IDEs, while maintaining consistency between operating characteristics. Furthermore, management tools may also be utilized with respect to security and update procedures, where an IDE version may be updated as new patches become available upon instantiation without a command from the user. Accordingly, management of the system may be improved by offloading tasks, such as routinely checking versions, deploying patches, and the like, to one or more systems provided by the resource provider environment.

Systems and methods of the present disclosure may simplify and standardize DEs by codifying them into repeatable toolchains and by automating the creation and configuration of various DEs. Accordingly, manual work associated with creating, managing, and updating development environments may be replaced by establishing definitions associated with different projects or with different portions of source code. Furthermore, systems and methods may enable attachment of a variety of different types of IDEs, thereby enabling users to select their preferred choice, rather than driving the user toward a certain implementation. In various embodiments, systems and methods of the present disclosure may utilize one or more serverless compute engines that execute various containers, where CPU and memory requirements, networking policies, and the like may be established within particular containers. Furthermore, systems and methods may further incorporate persistent volumes and privileged tools to provide additional layers of security to users.

FIG. 1 illustrates an example interface 100 for an IDE that may be used with one or more aspects of the present disclosure. In this example, the interface 100 may be a graphical user interface presented on a display for a user device. The illustrated interface 100 includes a header or ribbon 102, an editor panel 104, an explorer 106, and a tool bar 108. In this example, the tool bar 108 includes buttons or interactive icons 110, 112, 114 for various tools (e.g., toolkits, extensions, add-ins, etc.) that are accessible and in use with the interface 100. By way of example, a user may select different toolkits for integration into the IDE that may add certain types of functionality. Moreover, the tools may also be associated with background processes that are not actively selected from icons, such as libraries.

Users can often customize interfaces 100 and/or the toolkits utilized with their individual IDE, which may enable more efficient or improved work flow for the user by having the tools readily accessible. However, when working on a collaborative project, other users with access to code may not be aware that certain tool were installed and utilized for one or more portions of the source code. For example, an interface 120 may correspond to an entirely different IDE than the interface 100, or to the same interface with different user settings. In this example, the tool bar 108 for the interface 120 does not include "Tool 3" 114 found in the interface 100. Instead, the interface 120 utilizes "Tool 4" 122. As a result, execution of one or more code portions that relies on "Tool 3" while using the interface 120 may fail or be incorrect. This problem may lead to the user trying to debug or modify the code, which wastes time and resources when the problem is the lack of one or more tools, and not the code itself. Embodiments of the present disclosure may overcome this, and other problems, by preparing a definition for one or more source code files that may be evaluated and utilized when instantiating and attaching one or more IDEs for work on one or more code portions. The definition may include information related to the tools utilized or associated with the code portions and automatically incorporate those tools into whichever IDE the user selects, thereby maintaining functionality and usability across the code, even when different IDEs are utilized by individual users.

Figure 2:
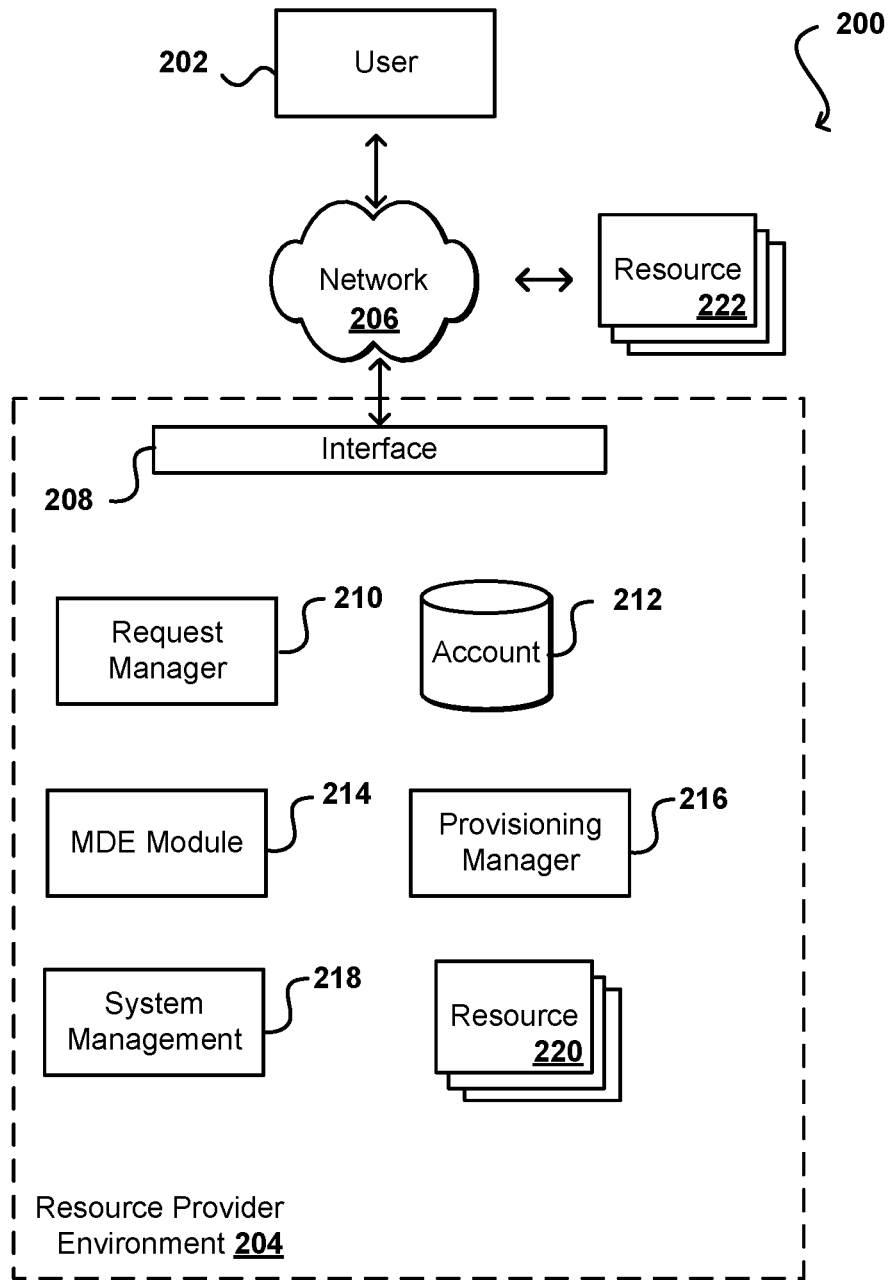
FIG. 2 illustrates an example system for provisioning resources for development environments in accordance with various embodiments.

FIG. 2 illustrates an example system 200 that can enable a user 202 (e.g., a client operating on a client device) to obtain access to one or more resources provided as part of a resource provider environment 204. It should be appreciated that various other components may also be included, or hosted separately in a different environment, and are not shown for clarity with the following discussion. Furthermore, these components are shown by way of example and are not intended to limit the scope of the present disclosure. As noted above, in various embodiments the resources may be related to serverless compute engines. In various embodiments, the serverless compute engines may be associated with Amazon Web Services (AWS) Fargate, which enables operation within containers that include information related to execution and use of various resources, such as computing resources. However, it should be appreciated that various embodiments of the present disclosure may also execute with systems that provision, deploy, and manage computing resources, such as Amazon Elastic Container Service (ECS) or Amazon Elastic Compute Cloud (EC2). These resources can include physical and virtual resources that may be located at one or more locations controlled by the provider or a third-party, or may be located on a location controlled by the user, or an entity with which the user is associated. In this example, a user can utilize the client device 202 to access resources of the resource provider environment 204 over one or more networks 206. The client device 202 can include any appropriate electronic device operable to send and receive requests, messages, or other such information over an appropriate network and convey information back to a user of the device. Examples of such client devices include personal computers, tablet computers, smart phones, notebook computers, and the like. The network(s) 206 can include any appropriate network, including an intranet, the Internet, a cellular network, a local area network (LAN), or any other such network or combination, and communication over the network can be enabled via wired and/or wireless connections. The resource provider environment 204 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

The resource provider environment 204 may be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network may implement various computing resources or services, which may include a virtual compute service (referred to in various implementations as an elastic compute service, a virtual machines service, a computing cloud service, a compute engine, or a cloud compute service), data processing service(s) (e.g., map reduce, data flow, and/or other large scale data processing techniques), data storage services (e.g., object storage services, block-based storage services (referred to in various implementations as cloud disks service, a managed disk service, a storage area network service, a persistent disk service, or a block volumes service), or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

In various embodiments, the resource provider environment 204 may include various types of electronic resources that can be utilized by multiple users for a variety of different purposes. In at least some embodiments, all or a portion of a given resource or set of resources might be allocated to a particular user or allocated for a particular task, for at least a determined period of time. This can include, for example, enabling a customer to launch one or more instance of one or more types of these resources. In at least one embodiment, a resource instance can include storage volumes, compute instances, and network interfaces, among other such options. This can include, for example, enabling a customer to launch one or more instances of one or more types of these resources. The sharing of these multi-tenant resources from a provider environment is often referred to as resource sharing, Web services, or "cloud computing," among other such terms and depending upon the specific environment and/or implementation.

In one embodiment, the resource provider environment 204 can correspond to an AWS environment, where a user may be a customer having an AWS account. In such an implementation, various additional monitoring and management services may be provided, such as AWS CloudFormation and AWS Systems Manager (SSM), which can use resource capacity from, for example, Amazon Simple Storage Service (S3) to provision resources for a resource stack in the customer account.

In this example, a request to the resource provider environment 204 can be received by an interface layer 208 of the environment. As known for network environments, the interface layer can include components such as interfaces (e.g., APIs), load balancers, request and/or data routers, and the like. In various embodiments, the request may be to launch or provision one or more DEs to enable a user to conduct one or more operations, such as modifying or creating source code for development of an application. The request may be associated with a variety of different resources, applications, extensions, storage solutions, and the like. A request manager 210 may evaluate the request and determine whether or not the user is authorized to make the request, whether resources are available, and the like. By way of example, the request manager 210 may evaluate information from one or more account databases 212 to determine whether the requestor is authorized to proceed, for example by passing credentials, requesting credentials from the user, or other types of verification processes. In at least one embodiment, user access may be restricted based on characteristics of the user. For example, a higher level employee may have read and write access to certain files, while a junior employee may only have read access. It should be appreciated that an administrator may set permission levels that may be accessed and evaluated by the request manager 210.

In the illustrated embodiment, an MDE module 214 may provide one or more APIs for doing various operations (e.g., create, read, update, delete, etc.) over environment definitions, instantiating them, and managing the lifecycle of running development environments (e.g., start, stop, suspend, resume, connect, disconnect, etc.). In one or more embodiments, the APIs may be stored in one or more databases or stables and executed as a thin layer over a data model. In various embodiments, management APIs may be built on top of various resource APIs that are used to manipulate tasks for a serverless or provisioned computing environment. In operation, the MDE module 214 may be utilized to call one or more provisioning managers 216, which may be used to allocate resources for various tasks, such as development tasks, which as noted above may be serverless or provisioned computing environments. It should be appreciated that the provisioning manager 216, or other components, may be integrated into the MDE module 214 or other systems of the resource provider environment 204, as well as be separately hosted and accessible via the network 206.

Various embodiments may also include one or more system management controllers (e.g., an SSM agent) 218. The System management controller 218 may be used to establish inbound connections into one or more environments provisioned by the provisioning manager 216. In various embodiments, credentials for the resource provider environment 204 are used to register a user to the one or more environments. Furthermore, the system management controller 218 may also provide a secure, encrypted connection to the one or more environments. For example, the system management controller 218 may connect via a secure shell protocol (SSH) configured to accept connections from the controller 218.

In at least one embodiment, the resource provider environment 204 also includes one or more resources 220, or in addition or in the alternative, may be in communication with one or more externally hosted resources 222. The resources 220, 222 may correspond to items such as compute resources, databases, firewalls, container clusters, machine learning systems, and the like. Furthermore, the resources 220, 222 may be temporarily provisioned or executed resources to instantiate or otherwise begin a task that may utilized additional resources. By way of example only, the resources 220, 222 may be used to host one or more tasks, for example responsive to a request or execution of instructions by the provisioning manager 216.

Embodiments of the present disclosure may provide one or more DEs to store user assets (e.g., intellectual property, credentials, documents, configuration files, etc.) with persistent storage to provide durability along with reliable access to the assets. In at least one embodiment, DEs are provided using serverless services to reduce infrastructure costs and operational burdens on the users. A secure environment boundary may be generated for individual DEs such that one generated environment cannot compromise or otherwise influence another environment, even among the same accounts. Furthermore, embodiments may enable cloud hosting and access to leverage infrastructure benefits such as elasticity, persistence, durability, fast startup, and security. In various embodiments, environments may be reproducible to enable users to generate multiple environments while also providing governance and management solutions, such as suspending accounts after periods of inactivity, to reduce costs. Various embodiments enable existing development tools to be integrated into the DEs, such as allowing users to choose one or more custom configured IDEs for use within the individual DEs.

One or more embodiments of the present disclosure may incorporate an MDE definition (e.g., def file) that serves as a blueprint to describe the tooling, source code, and hardware capabilities for one or more DEs. Definitions may be stored and managed by users, or within user accounts associated with a provider, and passed or provided along with one or more requests to provision and instantiate DEs. In at least one embodiment, an MDE definition file may also be stored along with a project's source code that specifies various toolchain parameters to prevent drift between developers, where one developer may utilize a tool and another may not, thereby leading to potential errors when the second developer attempts to run or modify a portion of code. Users with appropriate permissions may modify MDE definition files to enable dynamic launching of toolchains without re-launching an MDE instances.

One or more toolchains may act as an association between the source code (or portions of the source code) and one or more tools utilized to work on that code. The toolchains may form at least a portion of the definition and may be specified through files or images, among other options. Additionally, a shell toolchain may serve as a specific toolchain used by an MDE to checkout source code, build/launch other toolchains, and host IDE backend processes. Moreover, in various embodiments, security patches and the like may also be applied, for example upon instantiation, so that users are operating with the latest versions of software. In various embodiments, if users do not specify shell toolchains, a default may be utilized that includes minimal requirements to enable checking out source code.

As noted herein, various embodiments of the present disclosure are directed toward one or more development environments/MDE instances, where an instantiation of a definition can be accessed by one or more users. Once connected, users may utilize the MDE in the same manner as a client device that includes source code, tools, and credentials in local or accessible storage. The instances may be configured to only permit outbound connections and may be managed or controlled using one or more security processes that may include features such as timing out due to inactivity, suspension after inactivity, termination of processes, and deletion of non-persisted data.

Figure 3:
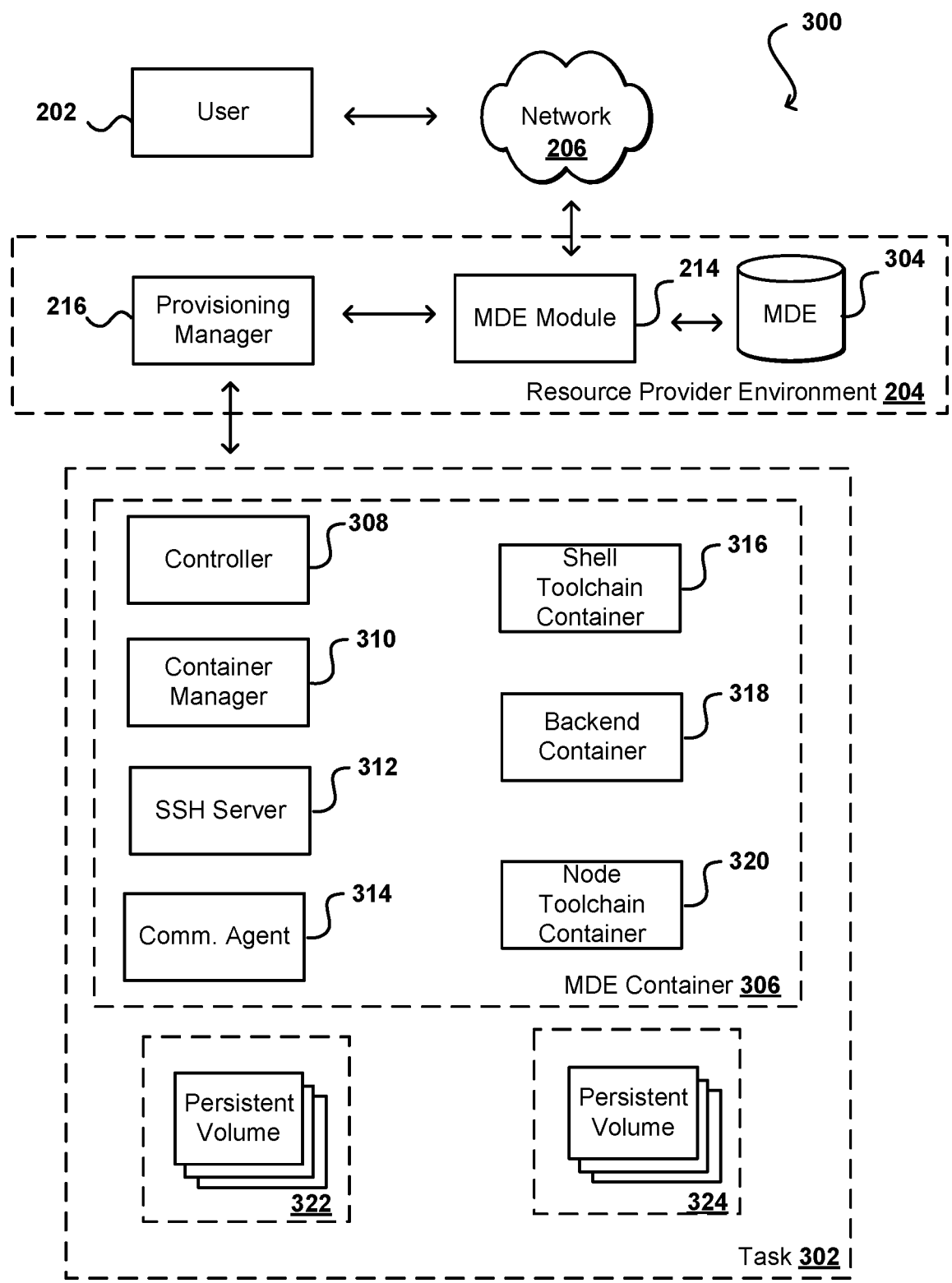
FIG. 3 illustrates an example environment for launching one or more customized development environments in accordance with various embodiments.

FIG. 3 illustrates an environment 300 that may be used with one or more embodiments of the present disclosure. In this example, a task 302 is launched responsive to one or more requests from the user 202. It should be appreciated that one or more processes associated with the environment 300 may be implemented as Lambda functions fronted by one or more API gateways to reduce infrastructure and simplify implementation. For example, as noted above, the user 202 may submit a request over the network 206 that is transmitted to the MDE module 214. The request may be associated with the formation of an MDE to enable generation or editing of source code, for application for developing one or more web applications. In certain embodiments, the environment may be generated based, at least in part, on one or more sets of instructions (e.g., a DE definition, an MDE definition). If such an instruction is not available, the user 202 may generate one.

In an example, the request may correspond to a request a create a DE definition, for example by calling one or more APIs. The definition may be generated responsive to the user request, where the request may include information such as toolchains, source-code, desired hardware capabilities, network configuration, and the like. In one or more embodiments, an MDE data store 304 may store the definition. Moreover, in other embodiments, the MDE module 214 may access the data store 304 when the definition exists. One or more interfaces may be provided to the user to either select the existing definition from the data store 304 or to generate a new definition.

In at least one embodiment, the user 202 may also request creation of an environment, rather than creation of a definition. For example, the user 202 may pass the definition to the MDE module 214, or may direct the MDE module 214 to retrieve the definition from the data store 304. Additionally, the user 202 may transmit additional information or instructions along with the request to generate the environment, such as identifying one or more persistent volumes. It should be appreciated that the resource provider environment 204 may include one or more toolkits or services to enable transmission of the information to the MDE module 214, such as by providing an interface where the user 202 can select various options.

In various embodiments, the MDE module 214 calls the provisioning manger 216 to prepare the resources and launch the environment. As noted above, the provisioning manager 214 may be associated with a serverless or server-based cloud system where one or more sets of resources may be provisioned for use by the user. In the illustrated embodiment, the task 302 is launched using provisioned resources in accordance with instructions provided by the user 202, for example instructions associated with the definition. Moreover, in one or more embodiments, defaults may also be established where the user 202 does not provide a definition. In various embodiments, the provisioning manager 216 may pass credentials for the user 202 or otherwise assume one or more user roles to enable provisioning of resources.

Various embodiments of the present disclosure may be associated with a collection of development environments modeled as one or more tasks, such as the task 302. Tasks may be grouped in cells and spread across multiple user accounts for the resource provider environment 204, where one or more tables or databases are used to store routing information. Task placement may be based, at least in part, on current loads and network affinity, among other options. In the illustrated example, the task 302 may be launched according to one or more task definitions and may include one or more containers.

In this example, an MDE container 306 corresponds to a privileged container that configures an MDE data plane, for example using information passed with the definition. As noted herein, the definition may contain information corresponding to one or more environmental variables. In this example, the container 306 may also include additional tools or resources, such as the controller 308, a container manager 310, an SSH server 312, and a communication agent 314.

The provisioning manager 216 may launch the task 302, configure networking, establish persistent storage volumes, and cause one or more processes associated with the MDE container 306 to execute. In at least one embodiment, the controller 308 may correspond to an MDE controller 308 that acts, at least in part, as an MDE instance metadata server to provide or receive credentials, orchestrate toolchain operations, checkout source-code, and the like. For example, the controller 308 may bootstrap the environment and set up one or more daemons, establish network routing and volumes, and the like. Furthermore, the MDE controller 308 may launch or otherwise execute one or more additional commands associated with other resources of the container 306. By way of example, the MDE controller 308 may launch the container manager 310 to manage various toolchains and IDE backends.

In one or more embodiments, the container manager 310 may correspond to a software platform that enables building, testing, and deployment of applications. The container manager 310 may be utilized to package one or more software systems into standardized units, which may be referred to as containers, that include executable instructions and associated components (e.g., libraries, system tools, code, runtime, etc.) to enable rapid deployment within any environment. In at least one embodiment, container manager 310 is associated with one or more systems, which may be provided through the resource provider environment 204, that enables standardization of various commands. Additionally, the container manager 310 may be used to build, start, or stop containers corresponding to various projects or tasks within the MDE container 306. Accordingly, the container manager 310 may enable both building and launching of toolchains, among other options. Furthermore, in various embodiments, the container manager 310 may be utilized, along with the controller 308, to manage toolchains and translate information between files to run containers. It should be appreciated that in one or more embodiments, separate container instances may be utilized and alternative container runtimes may be executed to provide barriers to prevent interference with MDE functionality.

In one or more embodiments, the container manager 310 may execute various operations, such as launching the SSH server 312, which may establish a local bound SSH daemon that can establish an SSH connection, for example with the system management module 218 or via the communication agent 314. For example, the communication agent 314 may execute and register an account for the corresponding container 306 to establish inbound connections. It should be appreciated that backend processes of the communication agent 314 may be established through one or more separate containers.

Various embodiments further include a shell toolchain container 316, a backend container 318, and a node toolchain container 320. In operation, the controller 308 may launch toolchains from the shell toolchain container 316, which may store various tools associated with the user account, which may be incorporated into various projects, as specified in the definition utilized with different portions of source code. In at least one embodiment, the container manager 310 may store or otherwise determine which toolchains are available prior to launch. The backend container 318 may include backend processes associated with one or more IDEs selected for launch within the DE. For example, the user may specify a particular IDE that includes various libraries, scripts, and the like for execution. One or more databases or repositories may store execution files for the IDE, for example a database associated with the backend container 318, to enable execution and operation of the IDE.

In operation, the MDE controller 308 may be utilized to identify and check out source code, which may be stored in one or more persistent storage volumes 322, 324. In various embodiments, the persistent storage volumes 322, 324 may be git repositories. As noted above, the source code may be associated with a def file that includes information regarding one or more tools associated with the source code, such as extensions utilized with an IDE. Checking out the source code may lock or otherwise block simultaneous editing of the code while the checkout persists, thereby preventing incongruent changes to the source code. The MDE controller 308 may scan the source code to identify and launch the appropriate toolchains, for example from the node toolchain container 320. As a result, the IDE may be presented to the user with the appropriate extensions and tools for further development and interaction with the checked out source code. Additionally, updates or patches may be applied to the IDE at launch to ensure the user has access to the latest version with respect to both functionality and security. In one or more embodiments, the IDE is selected by the user, and may be different from an IDE previously used to make changes to the source code. However, due to the def file, various components used to ensure compatibility are identified and launched along with the user's selected IDE.

In at least one embodiment, the provisioning manager 216 may continue to monitor or otherwise regulate actions associated with the task 302. For example, one or more rules may be utilized to determine whether the user is actively using the task 302, such as determining an idle time of the user, determining the idle time exceeds as threshold, and then ending or otherwise suspending the task 302 until another action is performed to unlock the task 302. Accordingly, one or more lifecycle events may be monitored to reduce costs or maintain security within the task 302.

In various embodiments, as noted above, user credentials may be specified within an MDE definition or be provided directly by a user when connecting to the service. These credentials may be made available through one or more toolchains using network interfaces, such as the provisioning manager 216, as noted above. Furthermore, in various embodiments, credentials may be pushed at different intervals, thereby preventing transmission of long-term credentials. It should be appreciated that, due to the attachment of potential third-party services via the IDEs, that various other services may be utilized by the resource provider environment 204 to protect user credentials.

Various embodiments of the present disclosure may also utilize one or more systems or processes to block or otherwise prevent access to various DEs. For example, a user device with a locally stored copy of an IDE and/or source code may block or prevent arbitrary inbound access. Accordingly, systems and methods may configure DEs to also block inbound network connections using, by way of example, the system manager 218 and associated components. In one or more embodiments, network interfaces, such as elastic network interfaces, may be established for the MDE and attached to a virtual private network (VPN) for the MDE. Additionally, another network interface may be attached to a VPN associated with the user of the MDE. Thereafter, the secure connection, such as via the SSH server 312, may be used for communications between the user and the MDE.

As noted above, embodiments of the present disclosure may be directed toward enabling a user to specify a particular IDE backend and project source code for use within an MDE. Upon receiving a request, the MDE is provisioned, attaches the IDE for user interaction, and enables access to the source code. In one or more embodiments, the MDE is accessible from a web browser, via internal support or integration into an IDE platform, or from a terminal using the MDE command line interface. In one or more embodiments, IDEs may be specified by an identifier or a container fragment.

Figure 4:
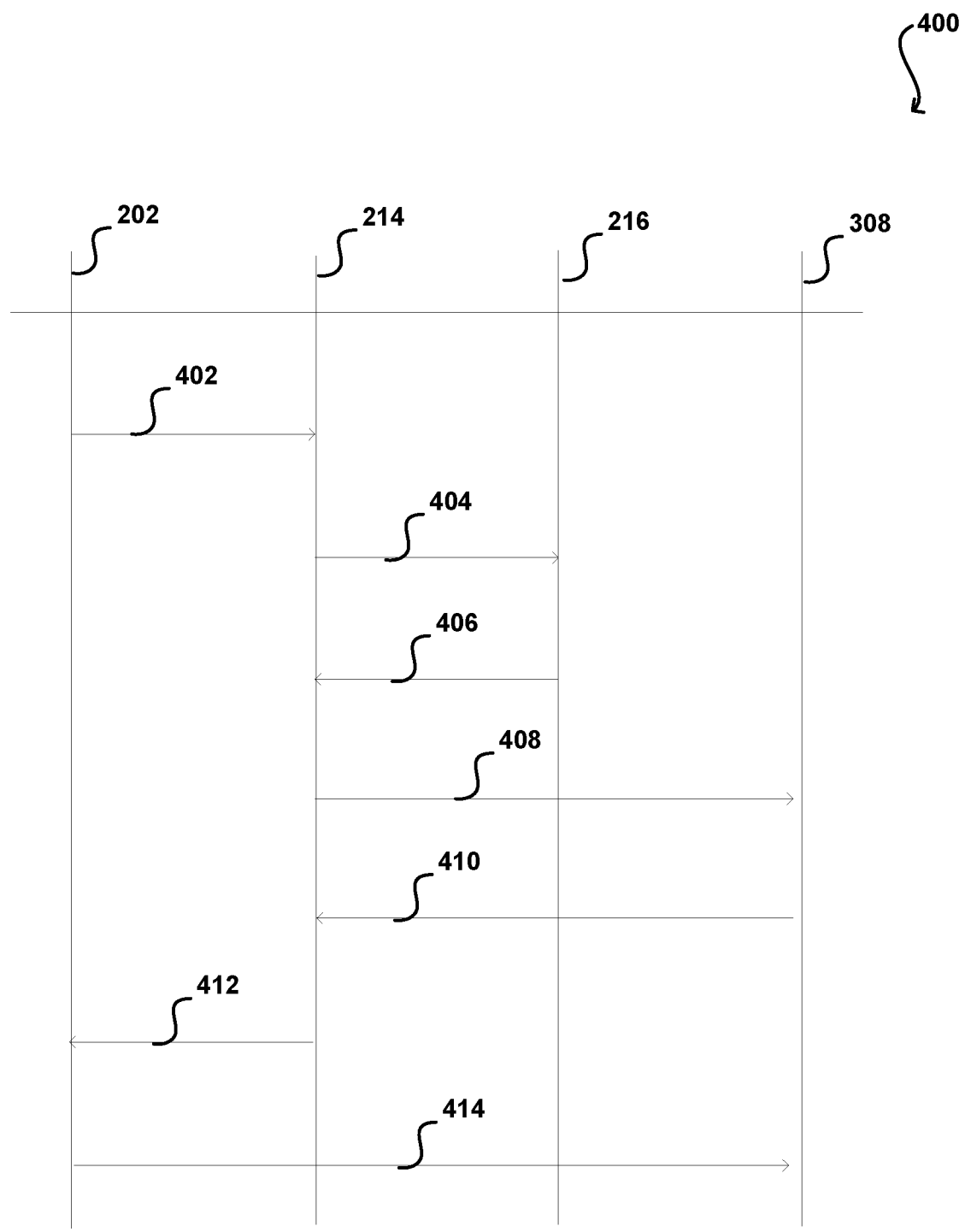
FIG. 4 illustrates a sequence diagram for one or more development environments in accordance with various embodiments.

FIG. 4 illustrates a communication sequence 400 for creating and connecting to an environment. It should be appreciated that additional steps may be incorporated into the sequence and also, in various embodiments, steps may be removed or combined. In this example, the user 202 submits a request 402 to the MDE module 214. For example, the user 202 may pass information to the MDE module 214, such as user credentials, a definition, source code to be utilized within the DE, one or more desired settings, an IDE of choice, or the like. As noted above, the MDE module 214 may be utilized to submit a command 404 to the provisioning manger 216, which may launch a task representative of the environment. Furthermore, the MDE module 214 and/or the provisioning manager 216 may be used to establish a secure connection. In various embodiments, the connection is formed within a container provisioned within the task.

The provisioning manager 216 may provide verification 406 of the connection to the MDE module 214, which may also include verification of the establishing of the task, which may include one or more containers as noted above. Moreover, the task may also be associated with provisioned resources. In this example, the MDE module 214 may provide information 408 to the MDE controller 308, such as one or more credentials, the definition, source code, an identifier for the IDE, and the like. The MDE controller 308 may proceed to execute one or more commands, such as executing toolchains and the like, in order to attach an IDE within the environment. The IDE may be configured to include one or more tool extracted from the definition based, at least in part, on the source code being utilized for that definition. That is, the definition may store information related to configurations to properly execute or work with the source code, which may be carried over and applied to the IDE to ensure compatibility.

The MDE controller 308 may provide a message 410 to the MDE module 214 to verify the IDE is established within the environment, which can then be relayed as a message 412 to the user 202. Thereafter, the user 202 may submit instructions 414 to the MDE controller 308 for execution within the environment, such as to perform tasks associated with the IDE. In this manner, the user 202 may provision an environment using a particularly selected IDE that is configured with one or more tools associated with source code being edited or used by the user. When provisioning the environment, the controller 308 may further identify recent updates or security patches for the associated configuration or IDE and automatically apply these updates, thereby reducing the burden for the user and providing a ready to execute IDE.

Figure 5A:
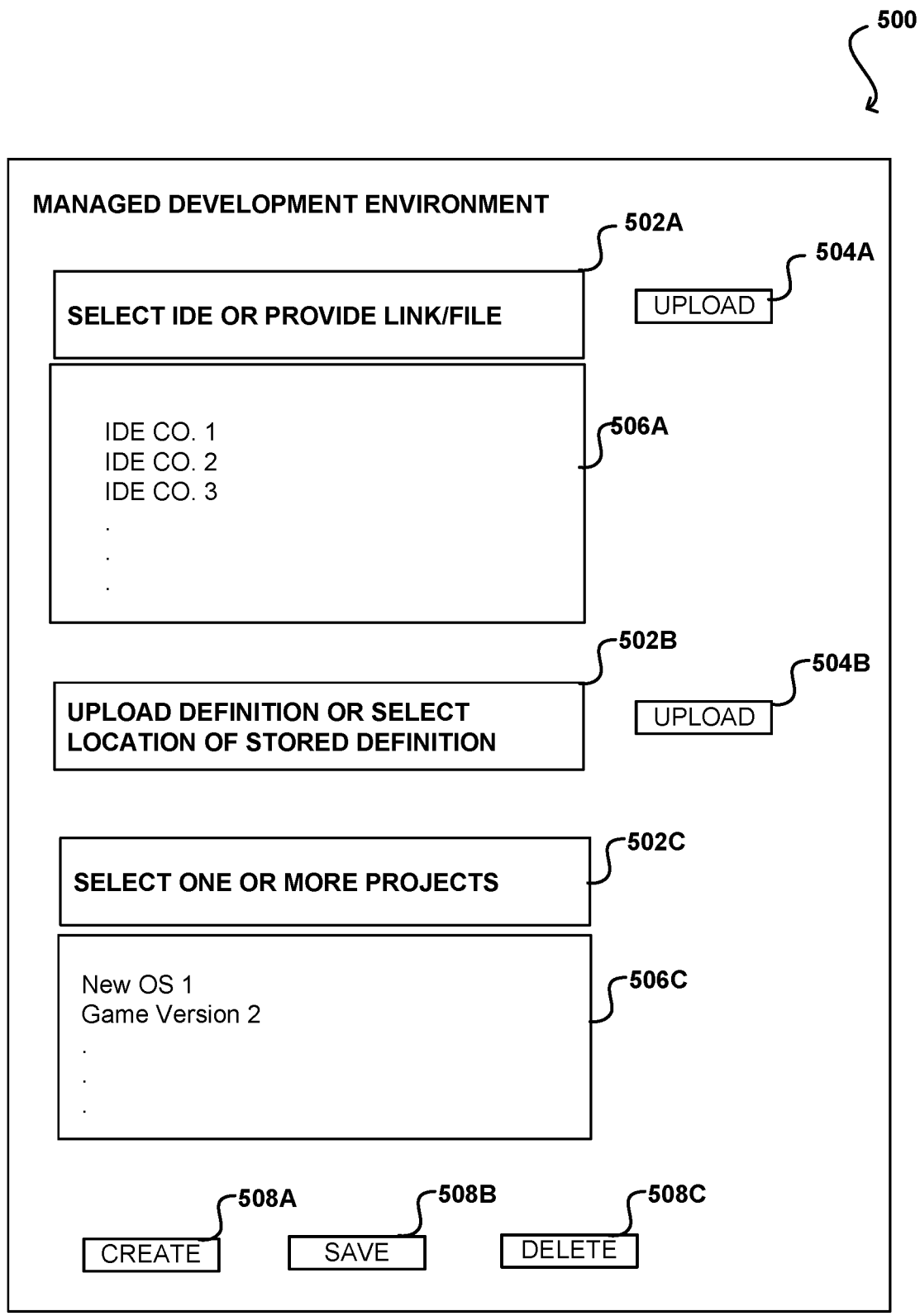
FIG. 5A illustrates an example interface for launching a development environment in accordance with various embodiments.
Figure 5B:
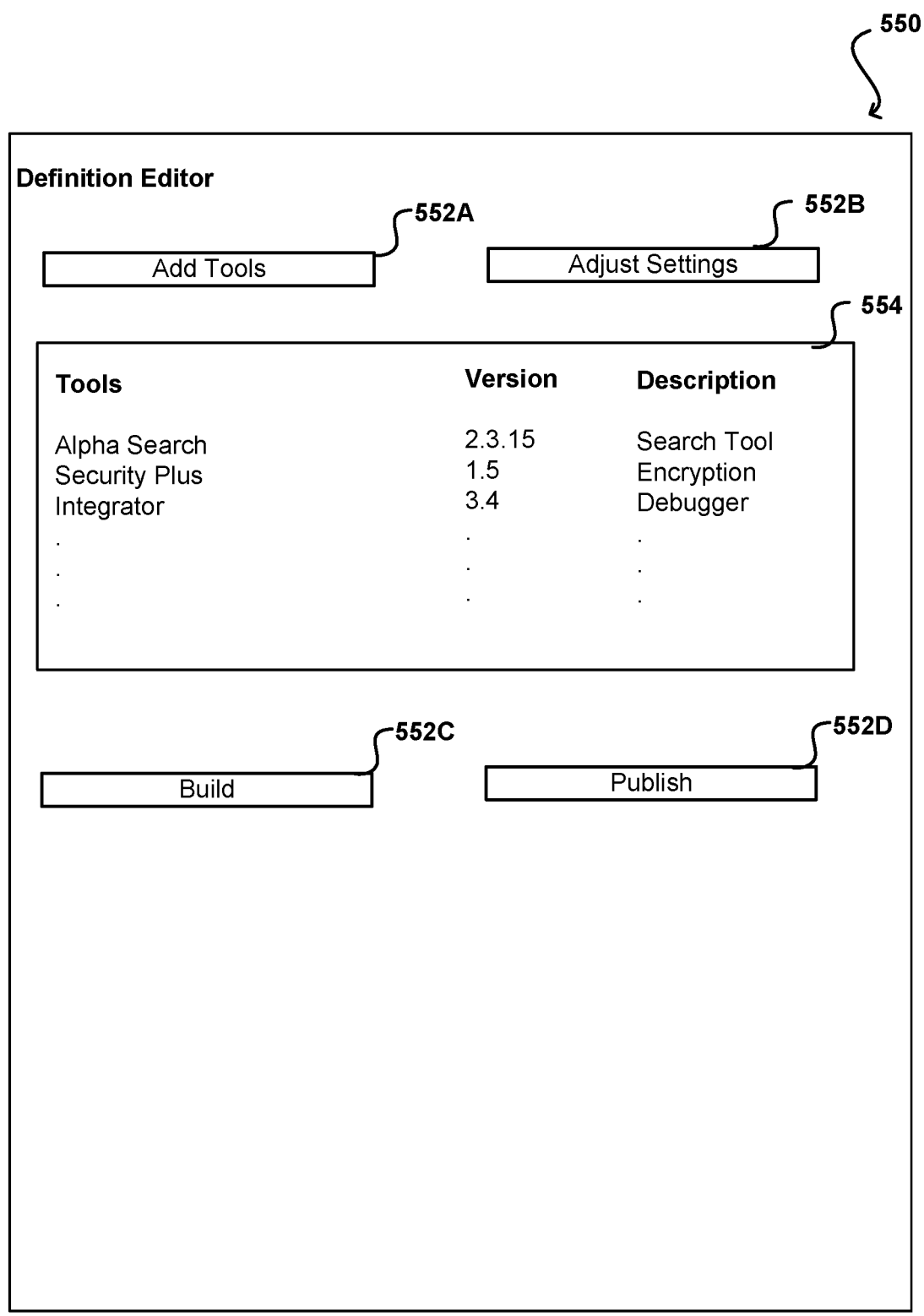
FIG. 5B illustrates an example interface for editing a definition file in accordance with various embodiments.

FIGS. 5A and 5B are example interfaces that may be utilized with embodiments of the present disclosure. In this example, an interface 500 may be utilized to enable a user to create one or more DEs. The interface 500 includes various headers and selectable elements that enable to user to tune one or more aspects of the DE and/or to provide instructions for generating the DE, such as selecting a def file. In this example, various option headers 502 are provided, which may correspond to an IDE selector 502A, a definition provider 502B, and a project selector 502C. In operation, the user may navigate to the interface 500, for example upon verification of one or more permissions for the user to utilize the system. The user may select an IDE of their choosing or upload an IDE for attachment to the environment, for example by selecting an IDE presented within a list 504A or by clicking a selectable element 506A. In various embodiments, certain IDEs may be preconfigured for operation with one or more user accounts. For example, an organization may have licenses for one or more different IDEs and may have their execution files, runtimes, libraries, and the like stored, for example in a cloud repository of the resource provider environment, for selection and attachment. In other embodiments, the user may provide their own link or file upload to enable use with a variety of different IDEs.

Additionally, the user may upload, select, or generate a definition (e.g., def file) via the definition provider 502B. For example, the user may provide instructions to retrieve the definition from one or more online repositories, as noted above, or may generate a new definition or upload a definition. The definition may include information corresponding to various projects, such as toolchains utilized with certain portions of source code. Moreover, in one or more embodiments, the definition may also include provisioning or instantiating information, which may include environment variables, to facilitate execution of a task and establishing the environment. As an example, hardware capabilities, toolchains, source code, network configurations, and the like may be provided with the definition. The definitions may be persistently stored and managed so that users may update or modify the definitions as new tools are used with a project or to track access and revisions.

In various embodiments, generation of the environment may be based, at least in part, on the project the user is working on. The project selector 502C may enable the user to select one or more projects, for example from the list 506C. As a result, the user may be able to provide the information required for the system to generate a personalized working environment, which may include a particularly selected IDE that is configured with appropriate tools to work on one or more portions of source code associated with a particular project. The user may proceed with creating the DE 508A, to save the settings 508B, or to delete the settings 508C, among other options. In this manner, a streamlined approach to generating one or more DEs, as background functionality such as downloading and installing toolchains, verifying operation of different extensions with IDEs, and establishing different network or hardware capabilities are offloaded to a cloud environment where a manager is configured to automatically establish the DE based on the properties provided by the user.

FIG. 5B illustrates an interface 550 that may be utilized with a definition editor where one or more users can adjust definitions associated with different source code segments. In this example, selectable icons 552A, 552B enable the user to interact with the interface. For example, the user can select the icon 552A to add additional tools to the definition, which may correspond to new tools utilized with one or more segments of source code. In this example, a tool list 554 is presented, which shows various tools that may be added to the definition. The user may select one or more of the tools, interact with selectable icon 552C to build and test the definition file, and then interact with selectable icon 552D to push or publish the update to the definition editor. In various embodiments, this may also update one or more log files, which may track changes or updates so that other users can see what changes have been implemented by different users. The new definition file will then be utilized as new DEs are established to provide access to newly added or changed tools, thereby maintaining a consistent environment for each user.

Figure 6:
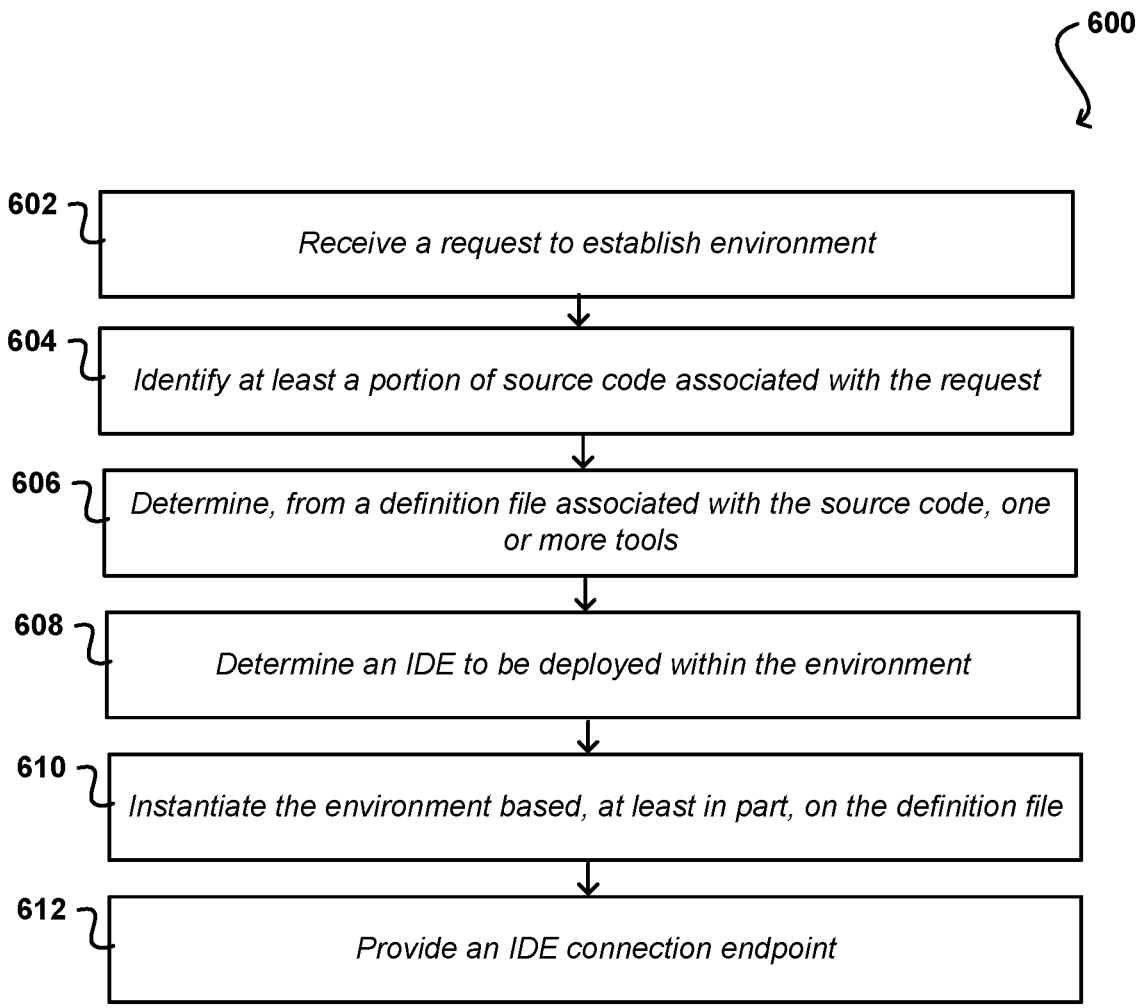
FIG. 6 illustrates an example process for deploying a development environment that can be utilized in accordance with various embodiments.

FIG. 6 illustrates an example process 600 for creating an MDE that can be utilized in accordance with various embodiments. It should be understood that there can be additional, fewer, or alternative steps performed in similar or alternative orders, or in parallel, within the scope of the various embodiments unless otherwise specifically stated. In this example, a request is received to establish an environment 602. The environment may be a development environment where one or more portions of source code are edited or utilized by a developer. In at least one embodiment, the request originates from a user having credentials to operate within a resource provider environment. Moreover, the request may include information corresponding to one or more user settings, such as a preferred IDE, a definition file, an identification of source code or a project, or the like. In various embodiments, the request may be a separate command submitted by a user, for example through an API interfacing with a cloud environment, or may be a request integrated into an existing software program. By way of example, a web client may be used to submit the request and then the IDE will be deployed within an established environment. In another example, a desktop client or software executing on a user device may be used, such as through a plug in or extension associated with the software.

In this example, at least a portion of source code associated with the request is identified 604. For example, the user may indicate one or more projects that will be used, which may be persistently stored within a resource provider environment. Additionally, the requestor may provide information associated with particular portions of the code or particular subsections of the project. Based at least in part on the portion of source code, the definition file may be evaluated to determine one or more tools associated with the source code 606. For example, the one or more tools may be add-ins or extensions from various IDEs that enable implementation of certain functionality necessary for executing the source code (e.g., libraries, compliers, debuggers, etc.). It should be appreciated that the definition file may include multiple different files, where different portions correspond to different code segments. Additionally, various embodiments may also include definition files that correspond to hardware settings for different resources being utilized within the resource provider environment.

In at least one embodiment, an IDE is determined 608. The IDE may be a user-selected IDE, which may correspond to one or more third party or native applications. The IDE may be attached to the environment to enable the user to interact with the code. The environment may be instantiated 610, where one or more settings of the environment may be based, at least in part, on the definition file. For example, the environment may be established with certain processing or networking capabilities using a particular IDE interface. An IDE connection endpoint may then be provided 612. The endpoint may be used to connect or otherwise establish connections with the environment, such as through a web client or through a desktop client. In an example, the IDE is deployed within the environment to include the one or more tools identified from the definition file. In another example, the IDE may attach or otherwise connect to the endpoint using a desktop client. Systems and methods may be utilized to provide flexibility with how users operate the system, thereby enabling full web client access or integration with existing desktop services. Accordingly, users will have access to each tool needed to interact with and work on their identified projects or code settings without manually installing the tools. Such configurations may reduce compatibility problems between different team members and enable improved collaboration while still enabling individual team members to use the IDE of their choice.

Figure 7:
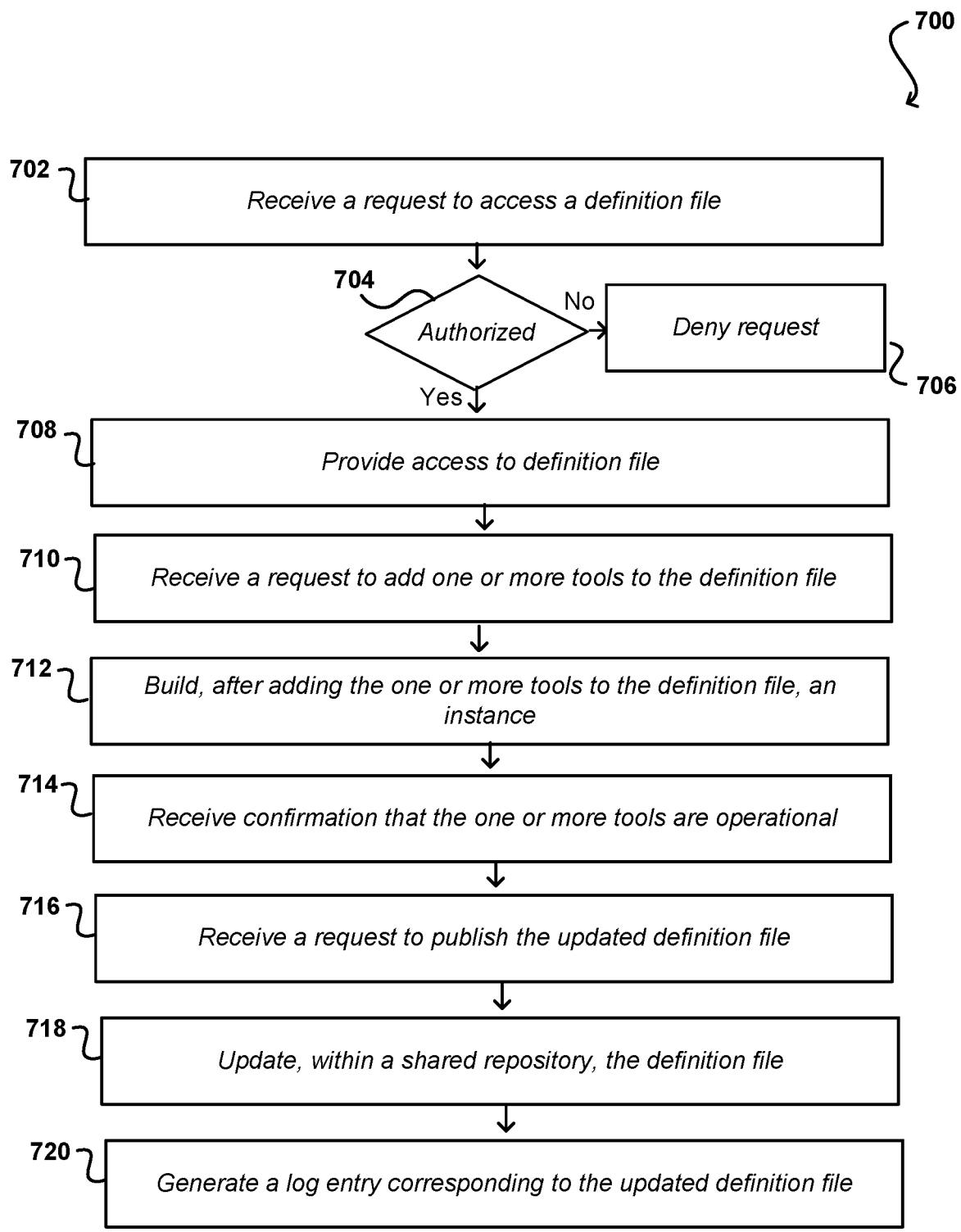
FIG. 7 illustrates an example process for editing a definition file that can be utilized in accordance with various embodiments.

FIG. 7 illustrates an example process 700 for modifying a definition file that can be utilized in accordance with various embodiments. In this example, a request is received to access a definition file 702. It is determined whether the request is from an authorized user 704. If not, the request is denied 706. If the user is authorized, access to the definition file is provided 708. For example, the user may be provided an interface that illustrates various portions of the definition file, such as portions of source code associated with the definition file, included tools, and the like. Additionally, the user may be granted access to an editor that enables modification of the definition file.

In this example, a request is received to add one or more tools to the definition file 710, but it should be appreciated that similar steps may be performed to remove or modify one or more tools. The one or more tools may be added and then the definition file may be executed within an instance 712. For example, an instance may be generated that executes the definition file in a manner that would be performed during normal operation of generating a DE. The user may evaluate the process to determine whether or not the tool was added successfully, such as checking to see if one or more properties of the tool execute in an expected manner. Additionally, it may be determined automatically whether the tool is installed correctly. Confirmation may be received regarding the installation of the one or more tools 714 and then a request to publish the updated definition file may be received 716. Publishing the updated definition file may correspond to updating the definition file within a shared repository 718, where the updated file will replace the existing file. A log entry may also be generated recording information associated with the update 720 to enable other users to determine what changes were made in the event it is desired to roll back or remove one or more tools. In this manner, definition files may be updated with a life of a project, where new tools may be automatically provisioned with DEs as needed.

Figure 8:
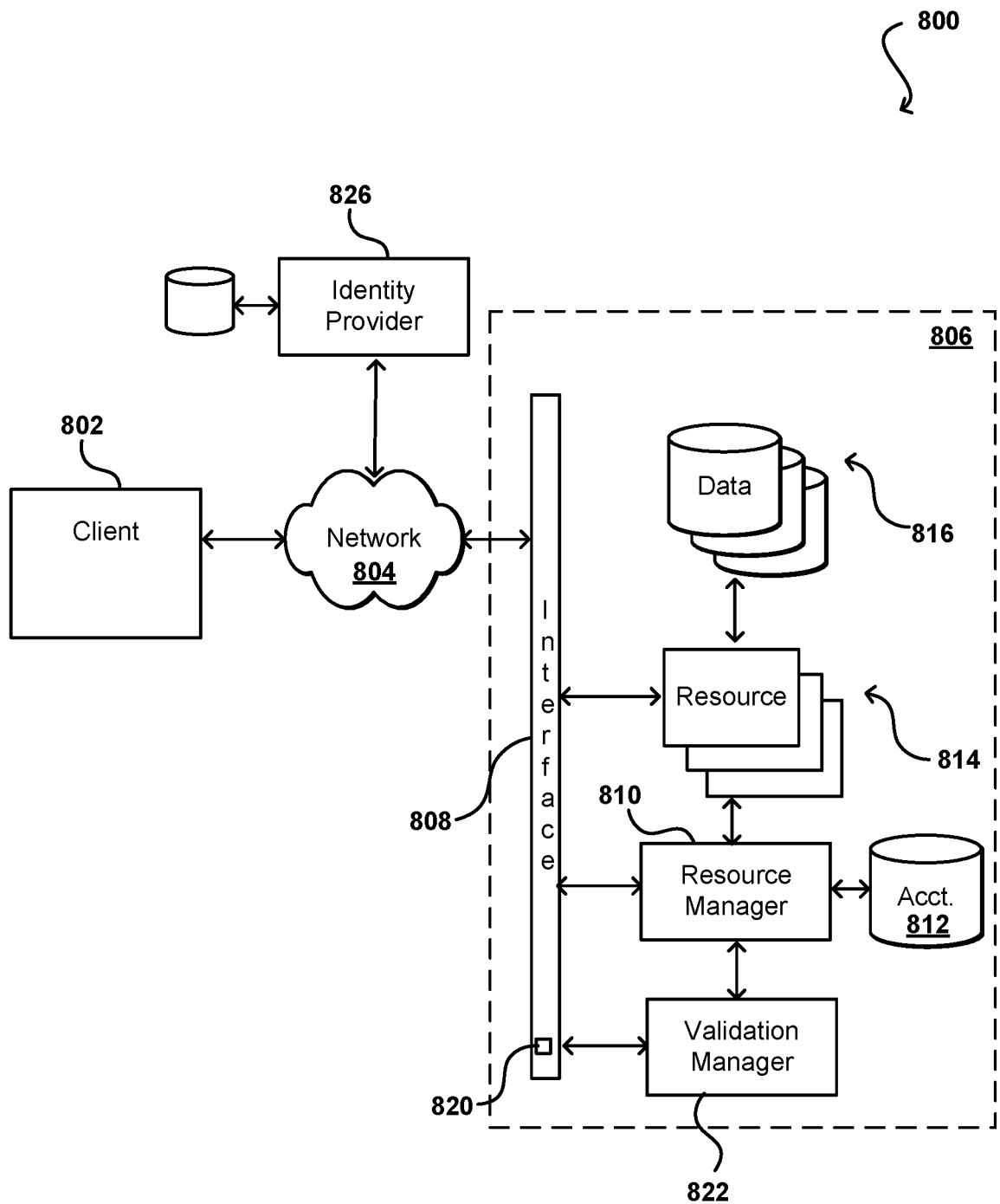
FIG. 8 illustrates an example environment in which aspects of various embodiments can be implemented.

FIG. 8 illustrates components of an example cloud computing environment 800 in which aspects of various embodiments can be implemented. In at least some embodiments, a user 802 wanting to utilize a portion of the resources 814 can submit a request over a network 804 that is received to an interface layer 808 of the provider environment 806. The interface layer can include application programming interfaces (APIs) or other exposed interfaces enabling a user to submit requests to the provider environment. The interface layer 808 in this example can also include other components as well, such as at least one Web server, routing components, load balancers, and the like. When a request to provision a resource is received to the interface layer 808, information for the request can be directed to a resource manager 810 or other such system, service, or component configured to manage user accounts and information, resource provisioning and usage, and other such aspects. A resource manager 810 receiving the request can perform tasks such as to authenticate an identity of the user submitting the request, as well as to determine whether that user has an existing account with the resource provider, where the account data may be stored in at least one data store 812 in the provider environment. A user can provide any of various types of credentials in order to authenticate an identity of the user to the provider. These credentials can include, for example, a username and password pair, biometric data, a digital signature, or other such information. These credentials can be provided by, or obtained from, a number of different entities, such as an identity provider 826, a key management service, a corporate entity, a certificate authority, an identify broker, and the like. In some embodiments, a user can provide information useful in obtaining the credentials, such as user identity, account information, password, user-specific cryptographic key, customer number, and the like. The identity provider can provide the credentials to the resource provider environment 806 and/or to the client device 802, whereby the client device can utilize those credentials to obtain access or use of various resources in the provider environment, where the type and/or scope of access can depend upon factors such as a type of user, a type of user account, a role associated with the credentials, or a policy associated with the user and/or credentials, among other such factors.

The resource provider can validate this information against information stored for the user, for example using a validation manager 822. If the user has an account with the appropriate permissions, status, etc., the resource manager 810 can determine whether there are adequate resources 814 available to suit the user's request, and if so, can provision the resources or otherwise grant access to the corresponding portion of those resources for use by the user for an amount specified by the request. This amount can include, for example, capacity to process a single request or perform a single task, a specified period of time, or a recurring/renewable period, among other such values. Additionally, the user may be granted access to data 816 associated with the user account. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 802 to communicate with an allocated resource without having to communicate with the resource manager 810, at least until such time as a relevant aspect of the user account changes, the user is no longer granted access to the resource, or another such aspect changes.

The resource manager 810 (or another such system or service) in this example can also function as a virtual layer of hardware and software components that handles control functions in addition to management actions, as may include provisioning, scaling, replication, etc. The resource manager 810 can utilize dedicated APIs 820 in the interface layer 808, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 808 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service.

Figure 9:
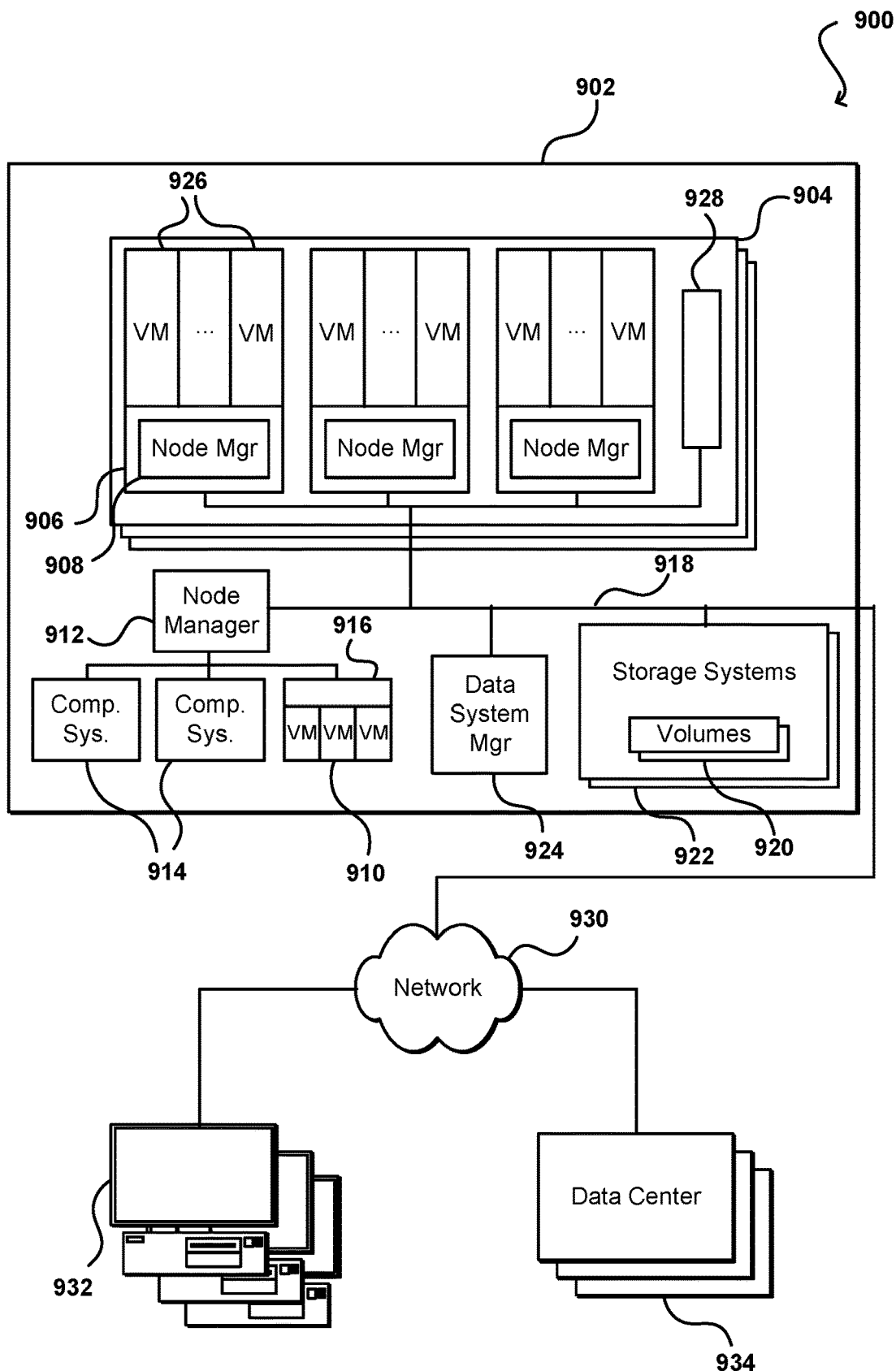
FIG. 9 illustrates components of an example data center that can be utilized in accordance with various embodiments.

FIG. 9 illustrates an example network configuration 900 in which such provisioning can be implemented in accordance with various embodiments. In this example configuration, multiple computing systems are operable to execute various programs, applications, and/or services, and further operable to access reliable block-based data storage, such as under the control of a block-based data storage service. In particular, in this example a block-based data storage service uses multiple block-based data storage systems in a data center to provide reliable, non-local, block-based data storage to executing programs or various other components, systems, or services. Multiple remote archival storage systems external to the data center may also be used to store additional copies of at least some portions of at least some block-based data storage volumes.

In this example, a data center 902 includes a number of racks 904, each rack including a number of host computing devices 906, as well as an optional rack support computing system 928 in this example embodiment. The host computing systems 906 on the illustrated rack 904 each host one or more virtual machines 926 in this example, as well as a distinct node manager module 912 associated with the virtual machines on that host computing system to manage those virtual machines. One or more other host computing systems 916 may also each host one or more virtual machines 910 in this example. Each virtual machine 910 may act as an independent resource node for executing one or more program copies or performing another such action or process for user data requests, I/O operations, etc. In addition, this example data center 902 further includes additional host computing systems 914 that do not include distinct virtual machines, but may nonetheless each act as a resource node for one or more tasks being executed for a user. In this example, a node manager module 912 executing on a computing system (not shown) distinct from the host computing systems 914 and 916 is associated with those host computing systems to manage the resource nodes provided by those host computing systems, such as in a manner similar to the node manager modules 908 for the host computing systems 906. The rack support computing system 928 may provide various utility services for other computing systems local to its rack 904 (e.g., long-term program storage, metering, and other monitoring of program execution and/or of non-local block data storage access performed by other computing systems local to the rack, etc.), as well as possibly to other computing systems located in the data center. Each computing system may also have one or more local attached storage devices (not shown), such as to store local copies of programs and/or data created by or otherwise used by the executing programs, as well as various other components.

This example the data center 902 also includes a computing system 924 that executes a data storage system manager module for the block-based data storage service to assist in managing the availability of non-local block-based data storage to programs executing on resource nodes provided by the host computing systems located within the data center (or optionally on computing systems located in one or more other data centers 934, or other remote computing systems 932 external to the data center). In particular, in this example the data center 902 includes a pool of multiple block-based data storage systems 922, which each have local block-based storage for use in storing one or more volume copies 920. Access to the volume copies 920 is provided over the internal network(s) 918 to programs executing on various resource nodes 910 and 914. As discussed in greater detail elsewhere, a block-based data storage system manager module 924 may provide a variety of services related to providing non-local block data storage functionality, including the management of user accounts (e.g., creation, deletion, billing, etc.); the creation, use and deletion of block data storage volumes and snapshot copies of those volumes; the collection and processing of performance and auditing data related to the use of block data storage volumes and snapshot copies of those volumes; the obtaining of payment from customers or other users for the use of block data storage volumes and snapshot copies of those volumes; etc. In some embodiments, the system manager module 922 may coordinate with the node manager modules 912, 908 to manage use of volumes by programs executing on associated resource nodes, while in other embodiments the node manager modules may not be used to manage such volume use. In addition, in other embodiments, one or more system manager modules 924 may be structured in other manners, such as to have multiple instances of the system manager executing in a single data center (e.g., to share the management of non-local block data storage by programs executing on the resource nodes provided by the host computing systems located within the data center), and/or such as to have at least some of the functionality of a system manager module being provided in a distributed manner by software executing on some or all of the server block data storage systems 922 (e.g., in a peer-to-peer manner, without any separate centralized system manager module on a computing system 924).

In this example, the various host computing systems, server block data storage systems, and computing systems are interconnected via one or more internal networks 918 of the data center, which may include various networking devices (e.g., routers, switches, gateways, etc.) that are not shown. In addition, the internal networks 918 are connected to an external network 930 (e.g., the Internet or another public data network) in this example, and the data center 902 may further include one or more optional devices (not shown) at the interconnect between the data center and an external network (e.g., network proxies, load balancers, network address translation devices, etc.). In this example, the data center 902 is connected via the external network 930 to one or more other data centers 934 that each may include some or all of the computing systems and storage systems illustrated with respect to data center 902, as well as other remote computing systems 932 external to the data center. The other computing systems 932 may be operated by various parties for various purposes, such as by the operator of the data center or third parties (e.g., customers of the program execution service and/or of the block data storage service). In addition, one or more of the other computing systems may be archival storage systems (e.g., as part of a remote network-accessible storage service) with which the block data storage service may interact, such as under control of one or more archival manager modules (not shown) that execute on the one or more other computing systems or instead on one or more computing systems of the data center, as described in greater detail elsewhere. Furthermore, while not illustrated here, in at least some embodiments, at least some of the server data storage systems may further be interconnected with one or more other networks or other connection mediums, such as a high-bandwidth connection over which the storage systems may share volume data (e.g., for purposes of replicating copies of volumes and/or maintaining consistency between primary and mirror copies of volumes), with such a high-bandwidth connection not being available to the various host computing systems in at least some such embodiments.

It will be appreciated that the example of FIG. 9 has been simplified for the purposes of explanation, and that the number and organization of host computing systems, server block data storage systems and other devices may be much larger than what is depicted in FIG. 9. For example, as one illustrative embodiment, there may be thousands of computing systems per data center, with at least some of those computing systems being host computing systems that may each host fifteen virtual machines or more, and/or with some of those computing systems being block-based data storage systems that may each store several volume copies. If each hosted virtual machine executes one program, a data center may execute tens of thousands of program copies at one time. Furthermore, hundreds or thousands (or more) of volumes may be stored on the server block data storage systems, depending on the number of server storage systems, size of the volumes, and number of mirror copies per volume. It will be appreciated that in other embodiments, other numbers of computing systems, programs and volumes may be used.

An environment such as that illustrated with respect to FIG. 9 can be used to provide and manage resources shared among various customers. In one embodiment, a virtualized storage system can be provided using a number of data servers, each having a number of storage devices (e.g., storage disks) attached thereto. The storage system can expose the storage to the customers as a Web service, for example. Customers then can submit Web services requests, or other appropriate requests or calls, to allocate storage on those servers and/or access that storage from the instances provisioned for those customers. In certain embodiments, a user is able to access the data volumes of these storage devices as if those storage devices are conventional block devices. Since the data volumes will appear to the customer instances as if each volume is a disk drive or similar block device, the volumes can be addressed with offsets, lengths, and other such conventional block device aspects. Further, such a system can provide what will be referred to herein as "read after write" consistency, wherein data is guaranteed to be able to be read from the data as soon as the data is written to one of these data volumes. Such a system can provide relatively low latency, such as latencies less than about ten milliseconds. Such a system thus in many ways functions as a traditional storage area network (SAN), but with improved performance and scalability.

Using a management system as illustrated in FIG. 9, for example, a customer can make a Web service call into an appropriate API of a Web service layer of the system to provision a data volume and attach that volume to a data instance for that customer. The management system can be thought of as residing in a control plane, or control environment, with the data volumes and block storage devices residing in a separate data plane, or data environment. The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

In one example, a customer with at least one provisioned instance can call a "CreateVolume" or similar API, via Web services, which enables the customer to specify the amount of storage to be allocated, such as a value between 1 GB and 1 TB, in 1 GB increments. Components of the control plane, such as a system manager module, can call into the data plane to allocate the desired amount of storage from the available resources, and can provide the customer with an identifier for the data volume. In some embodiments, the customer then can call an "AttachVolume" or similar API, wherein the customer provides values for parameters such as an instance identifier, a volume identifier, and a device name, depending on factors such as the operating system of the instance, using a scheme that the operating system provides for hard drives and similar storage devices, as from inside the instance there is no apparent difference, from at least a functionality and naming point of view, from a physical hard drive. Once the customer has attached the data volume to a provisioned instance, the customer can cause various functionality to be performed, such as to build a file system, use as raw storage for a data system, or any other such activity that would normally be performed with a conventional storage device. When the customer no longer requires the data volume, or for any other appropriate reason, the customer can call a "DetatchVolume" or similar API, which can cause the association of the instance to that volume to be removed. In some embodiments, the customer can then attach a new instance or perform any of a number of other such activities. Since the data volume will fail independently of the instances in some embodiments, the customer can attach a volume to a new instance if a currently associated instance fails.

Figure 10:
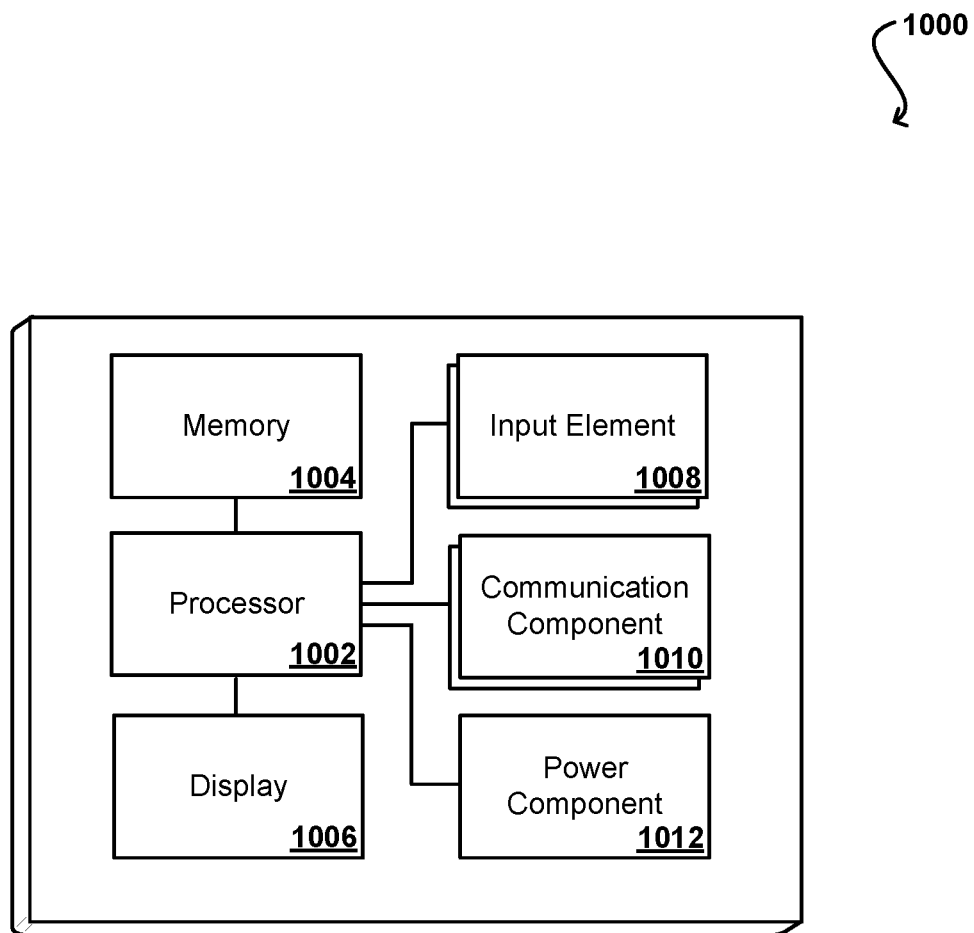
FIG. 10 illustrates components of an example computing device that can be used to perform aspects of the various embodiments.

FIG. 10 illustrates a logical arrangement of a set of general components of an example computing device 1000. In this example, the device includes a processor 1002 for executing instructions that can be stored in a memory device or element 1004. As would be apparent to one of ordinary skill in the art, the device can include many types of memory, data storage, or non-transitory computer-readable storage media, such as a first data storage for program instructions for execution by the processor 1002, a separate storage for images or data, a removable memory for sharing information with other devices, etc. The device typically will include some type of display element 1006, such as a touch screen or liquid crystal display (LCD), although devices such as portable media players might convey information via other means, such as through audio speakers. As discussed, the device in many embodiments will include at least one input element 1008 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 1000 of FIG. 10 can include one or more network interface or communication elements or components 1010 for communicating over various networks, such as a Wi-Fi, Bluetooth, RF, wired, or wireless communication systems. The device in many embodiments can communicate with a network, such as the Internet, and may be able to communicate with other such devices. The device will also include one or more power components 1012, such as power cords, power ports, batteries, wirelessly powered or rechargeable receivers, and the like.

Example environments discussed herein for implementing aspects in accordance with various embodiments are primarily Web-based, as relate to Web services and cloud computing environments, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

It should be understood that there can be several application servers, layers, or other elements, processes, or components, which may be chained or otherwise configured, which can interact to perform tasks as discussed and suggested herein. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

A data store can include several separate data tables, databases, or other data storage mechanisms and media for storing data relating to a particular aspect. The data store is operable, through logic associated therewith, to receive instructions from a server, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server, and typically will include a non-transitory computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are described. Thus, the depictions of various systems and services herein should be taken as being illustrative in nature, and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving a request to establish a development environment;
   determining, based at least in part on the request, at least a portion of source code associated with the request;
   determining, from a definition file, one or more tools associated with the portion of source code;
   determining an integrated development environment (IDE) for use within the development environment;
   determining an equivalent set of one or more tools for the portion of source code corresponding to the determined IDE;
   determining, from a second definition file, one or more operating parameters associated with the IDE;
   instantiating the development environment having at least the one or more operating parameters; and
   providing an IDE connection endpoint, the IDE including the equivalent set of the one or more tools associated with the portion of source code.

2. The computer-implemented method of claim 1, further comprising:
   retrieving the second definition file associated with the development environment, the second definition file associated with one or more second operating parameters of the development environment, wherein the development environment is instantiated using the one or more second operating parameters.

3. The computer-implemented method of claim 1, further comprising:
   determining one or more patches or updates associated with the IDE; and
   installing the one or more patches or updates.

4. The computer-implemented method of claim 1, further comprising:
   receiving a request to edit the definition file;
   determining the request is from an authorized user;
   receiving a request to add one or more additional tools to the definition file; and
   updating the definition file to include the one or more additional tools.

5. The computer-implemented method of claim 1, wherein the development environment is provisioned within a container executed within a resource provider environment.

6. A computer-implemented method, comprising:
   determining a definition file is associated with one or more portions of a project;
   identifying, within the definition file, one or more tools for execution with the one or more portions of the project;
   determining, from a second definition file, one or more operating parameters associated with an integrated development environment (IDE);
   determining an equivalent set of the one or more tools for the portion of source code corresponding to the determined IDE; and
   attaching the IDE to a provisioned development environment having at least the one or more operating parameters, the IDE including the equivalent set of the one or more tools from the definition file.

7. The computer-implemented method of claim 6, further comprising:
   receiving a request associated with the IDE, the IDE selected from a group of IDEs; and
   selecting the IDE associated with the request for the attachment.

8. The computer-implemented method of claim 6, further comprising:
   identifying the one or more portions of the project within a storage location; and
   checking out the one or more portions of the project.

9. The computer-implemented method of claim 8, wherein the storage location is a persistent storage volume.

10. The computer-implemented method of claim 6, further comprising:
    determining one or more patches associated with the IDE; and
    installing the one or more patches.

11. The computer-implemented method of claim 6, further comprising:
    providing, to one or more registered users, the definition file;
    receiving a request to modify one or more tools associated with the definition file;
    building the definition file, after modifying the one or more tools; and
    updating the definition file responsive to modifying the one or more tools.

12. The computer-implemented method of claim 11, further comprising:
    receiving confirmation that modifying the one or more tools is successful.

13. The computer-implemented method of claim 6, further comprising:
    receiving activity information associated with the development environment;
    determining that an idle time exceeds a threshold; and
    suspending the development environment.

14. The computer-implemented method of claim 6, further comprising:
    determining one or more changes within the development environment are associated with non-persistent storage; and
    deleting the one or more changes.

15. A system, comprising:
    at least one processor; and memory including instructions that, when executed by the at least one processor, cause the system to:
- determine a definition file is associated with one or more portions of a project;
- identify, within the definition file, one or more tools for execution with the one or more portions of the project;
- determine, from a second definition file, one or more operating parameters associated with an integrated development environment (IDE);
- determine an equivalent set of the one or more tools for the portion of source code corresponding to the determined IDE; and
- attach the IDE to a provisioned development environment having at least the one or more operating parameters, the IDE including the equivalent set of the one or more tools from the definition file.

16. The system of claim 15, wherein the instructions when executed further cause the system to:
- receive a request associated with the IDE, the IDE selected from a group of IDEs; and
- select the IDE associated with the request for the attachment.

17. The system of claim 15, wherein the instructions when executed further cause the system to:
- identify the one or more portions of the project within a storage location; and
- check out the one or more portions of the project wherein the one or more handlers corresponds to a command to perform at least one of a create action, a delete action, an update action, a read action, or a list action on a resource instance.

18. The system of claim 17, wherein the storage location is a persistent storage volume.

19. The system of claim 15, wherein the instructions when executed further cause the system to:
- determine one or more patches associated with the IDE; and
- prior to deploying the IDE, install the one or more patches.

20. The system of claim 15, wherein the instructions when executed further cause the system to:
- provide, to one or more registered users, the definition file;
- receive a request to modify one or more tools associated with the definition file;
- build the definition file, after modifying the one or more tools; and
- update the definition file responsive to modifying the one or more tools.

* * * * *